US006026614A

United States Patent [19]
Johnston

[11] Patent Number: 6,026,614
[45] Date of Patent: Feb. 22, 2000

[54] CABLE BRACED, OPEN AIR CHAPEL/MEETING HALL

[76] Inventor: Barry Johnston, 2423 Pickwick Rd., Baltimore, Md. 21207

[21] Appl. No.: 09/081,439

[22] Filed: May 19, 1998

Related U.S. Application Data

[60] Provisional application No. 60/047,229, May 19, 1997.

[51] Int. Cl.[7] ........................................... E04B 7/00
[52] U.S. Cl. .................. 52/82; 52/18; 52/23; 52/152; 52/223.13; 52/223.14; 52/273; 52/80.1; 52/80.2; 52/83; 52/222; 52/63
[58] Field of Search ..................... 52/18, 82, 152, 52/23, 63, 80.1, 80.2, 83, 223.14, 222, 273

[56] References Cited

U.S. PATENT DOCUMENTS

| | | | |
|---|---|---|---|
| 2,126,413 | 8/1938 | Respess | 189/1.5 |
| 2,881,718 | 4/1959 | Stromeyer | 108/1 |
| 4,074,502 | 2/1978 | Peter | 52/741 |
| 5,038,536 | 8/1991 | De Mendoza Sans | 52/146 |
| 5,072,555 | 12/1991 | Geiger | 52/82 |
| 5,522,186 | 6/1996 | Jarman | 52/73 |
| 5,597,005 | 1/1997 | Thomas | 135/87 |
| 5,623,788 | 4/1997 | Bimberg et al. | 52/23 |

*Primary Examiner*—Christopher T. Kent
*Assistant Examiner*—Nkeisha J. Maddox
*Attorney, Agent, or Firm*—Lowe Hauptman Gopstein Gilman & Berner

[57] ABSTRACT

A cable braced, open air chapel or meeting hall is formed from a series of cables interconnected to each other in countertension to provide a rigid structural support to provide basic definition for the building structure. One set of cables is preferably tensioned through weights or spring assemblies imparting tension in the downward direction in turn transmitted to the second set of cables in countertension. The second set of cables may extend upwardly in a curved configuration for connection to the upper end of a support tower. The cables slidably pass through the tower through a series of passageways formed in a honeycomb-like mounting structure enabling the back ends of the cables to be anchored to the ground in a spread, fan-like configuration. The weighted or spring tensioned ends of the first cables and the ability of the second cables to pass slidably through the tower support enable the cabled arrangement to breathe as a result of thermally induced expansion and contraction.

21 Claims, 10 Drawing Sheets

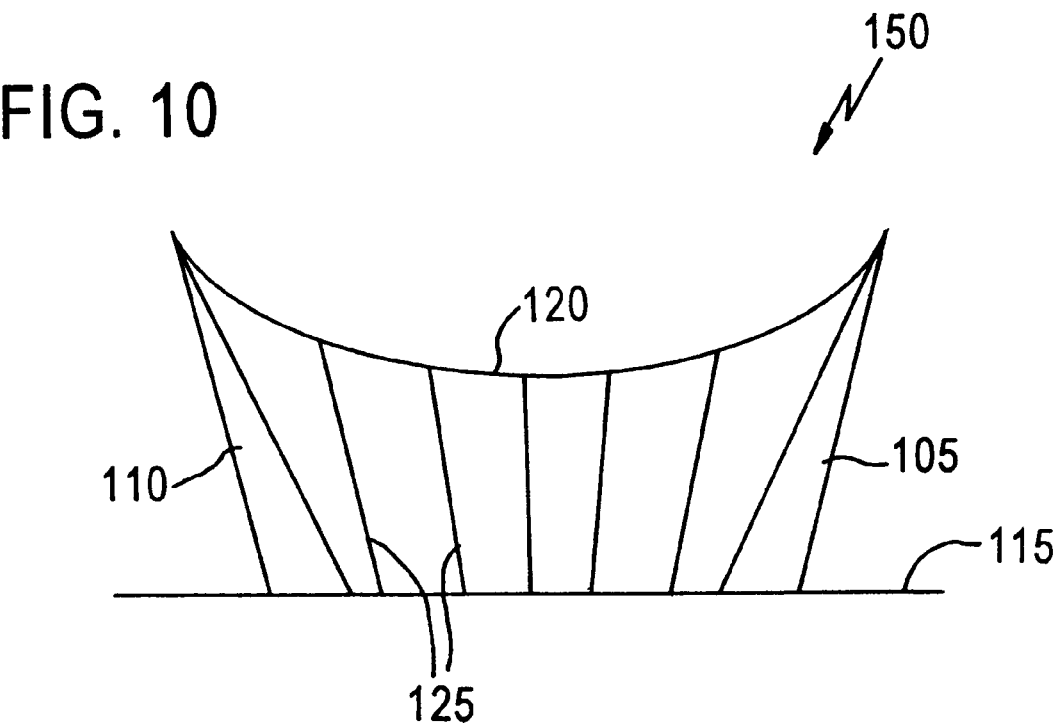
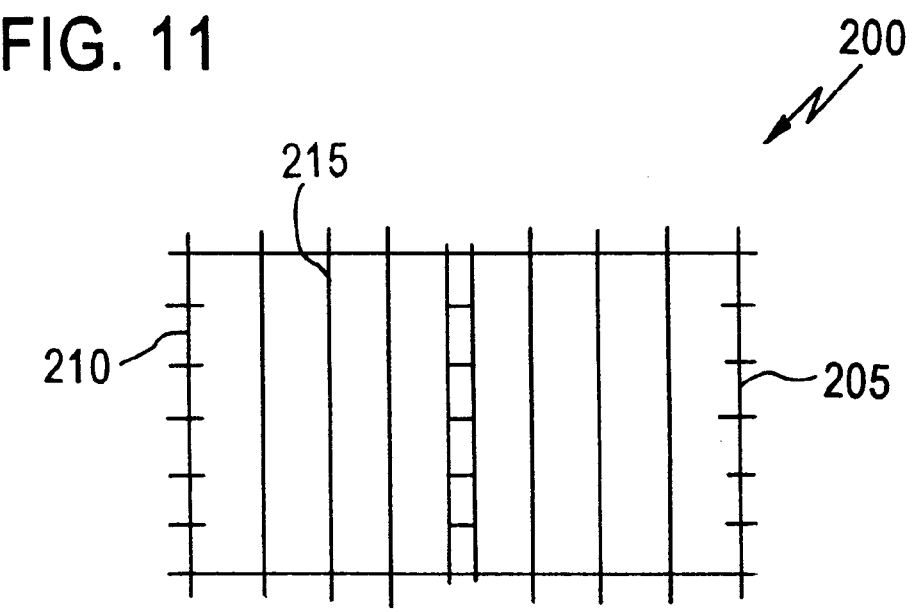

CABLE BRACED, OPEN AIR CHAPEL/ MEETING HALL

RELATED APPLICATIONS

The present application claims priority from U.S. Provisional patent application Ser. No. 60/047,229, May 19, 1997 entitled "CABLE BRACED, OPEN AIR CHAPEL/ MEETING HALL", the entire disclosure of which is hereby expressly incorporated by reference herein.

TECHNICAL FIELD

The present invention relates generally to building structures made of concrete and stainless steel cables and, more particularly, to building structures in which tensioned cable arrangements are used to define building definition while providing structural support capable of supporting building cladding materials and thermal expansion and contraction.

BACKGROUND ART

Chapels and meeting halls are large and often open air structures used for religious and secular congregational meetings as is well known. Because of the large, and expansive nature of such building structures, such building designs are often susceptible to destruction as a result of high winds, tornadoes and hurricanes, requiring either expensive repair or replacement and considerable reconstruction time during which the structure is unavailable to the community.

It is accordingly an object of the present invention to provide an open air chapel or meeting hall that is capable of withstanding high winds, tornadoes and/or hurricane force winds.

Another object is to provide a building structure that is inexpensive to manufacture.

Still another object is to provide a building that is easy to install and capable of use in rugged and hostile environments.

DISCLOSURE OF THE INVENTION

The present invention is a building structure which is comprised of a first set of cables extending in spaced relation to each other and a second set of cables extending in a direction transverse to the first set of cables. The first and second cable sets are operatively connected to each other. Means is provided for applying tension to at least one of the first and second sets of cables so that the first and second sets receive countertension to thereby define a rigid countertensioned structure. Means is provided for anchoring the first and second sets of cables to a support structure.

The anchoring means preferably includes a plurality of load bearing members to which the first and second cable sets are operatively connected. In this manner, the cable sets define at least a roof region of the building. A series of panel members, such as plywood panels optionally covered with copper cladding or roofing material, are attached to at least ones of the first and second cable sets.

The load bearing members constituting the anchoring means may take a variety of different forms common to the building industry. For example, within a building structure functioning as an open air chapel or meeting hall, certain ones of the load bearing members may be a series of interconnected gables located at one end of the hall or chapel and to which ends of one cable set may be fixedly attached. The load bearing structure at the opposite end of the hall, in the preferred embodiment, is an elongated tower that may be of precast concrete units suitably reinforced with steel rods. The cable set attached to the gables may soar upwards while converging for connection to the upper end of the tower and, in this manner, define the basic configuration of the building roof. The gable units and the tower units may be the same in construction and size.

The ends of the cables connecting to the tower may be fixedly attached to the tower. However, in a preferred embodiment of the invention, and to minimize the expense associated with tower construction, the cables connecting to the tower preferably pass through the tower in sliding supporting contact therewith. The back ends of these cables pass rearwardly through the tower and extend downwards to the ground for fixed connection. By arranging the back ends of the cables in a fan-like or spread condition, a soaring, aesthetic effect is realized. Slidable support of the cables through the tower advantageously enable the cables to accommodate thermal expansion and contraction.

Preferably, a series of hollow tubular members are fixedly mounted to the tower through which the cables respectively extend. This is a preferred procedure for slidably supporting the cables on the tower. These hollow tubular members may be fixedly connected to each other (e.g. by welding) to form a rigid structure of integral or unitary construction. In the alternative, the hollow tubular members may be a casted structure to form a rigid structure of integral or unitary construction. It is also within the scope of this invention to provide a mounting structure fixedly mounted to the tower and having a series of passageways through which the second set of cables respectively extend. This mounting structure may also have a honeycomb-like or rib-cage construction. Such a structure may be termed a 'poly-grommet'.

The second set of cables radiate downwardly from the tower in a radial direction for connection to the gables as noted above. The gables are connected together to extend in a circumferential direction (relative to the position of the tower and the second set of cables) for a predetermined arcuate interval. This arcuate interval may range to extend through from one to four quadrants. The first set of cables extend generally perpendicular to the second set, i.e. in a circumferential direction or as chords, relative to the tower and the second set. One or both opposite ends of the first cable set are connected to either weights or springs that apply tension to the first set in a first or downward direction to allow for expansion and construction. The first set of cables are preferably interconnected to the second set through clamping members or other types of connection structures to in turn transmit tension to the second set. In this manner, the first and second sets of cables create a rigid tensioned structure capable of receiving conventional roofing and/or cladding materials.

The present invention also encompasses a building structure comprising a first set of cables extending in spaced relation to each other and means for applying tension to the cables to create rigidity in the cable set as a support structure. The cables are operatively connected to load bearing members anchored to a support surface. In this invention, one of the load bearing members is an elongated tower and the set of cables are operatively connected and partially supported by the tower.

The invention also concerns a cable guiding structure adapted for use with a tower or elevated support structure through which a plurality of cables are adapted to extend in sliding supported contact. The guiding structure includes a series of individual passageways open at opposite ends thereof through which cables respectively extend for support on the elevated structure.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modification in various obvious respects, all without departing from the invention. Accordingly, the drawing and description are to be regarded as illustrative in nature, and not as restrictive.

BRIEF DESCRIPTION OF DRAWINGS

FIG. 10 is a schematic elevation view of another embodiment of the invention;

FIG. 11 is a top plan schematic view of yet another embodiment of the invention;

BEST MODE FOR CARRYING OUT THE INVENTION

Figure 1:
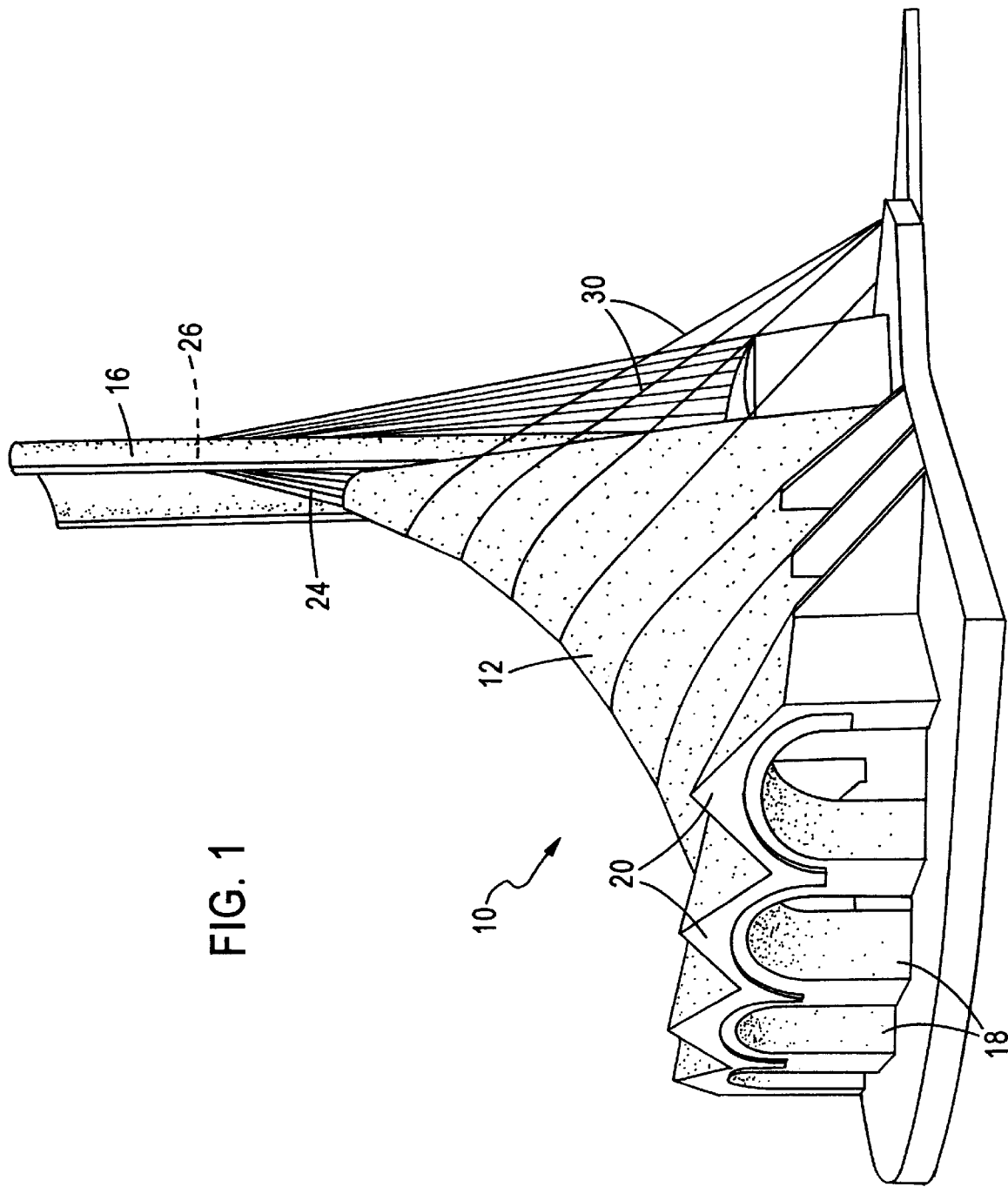
FIG. 1 is a perspective view of a cable braced, open air chapel or meeting hall constructed in accordance with a preferred embodiment of the present invention.
Figure 2:
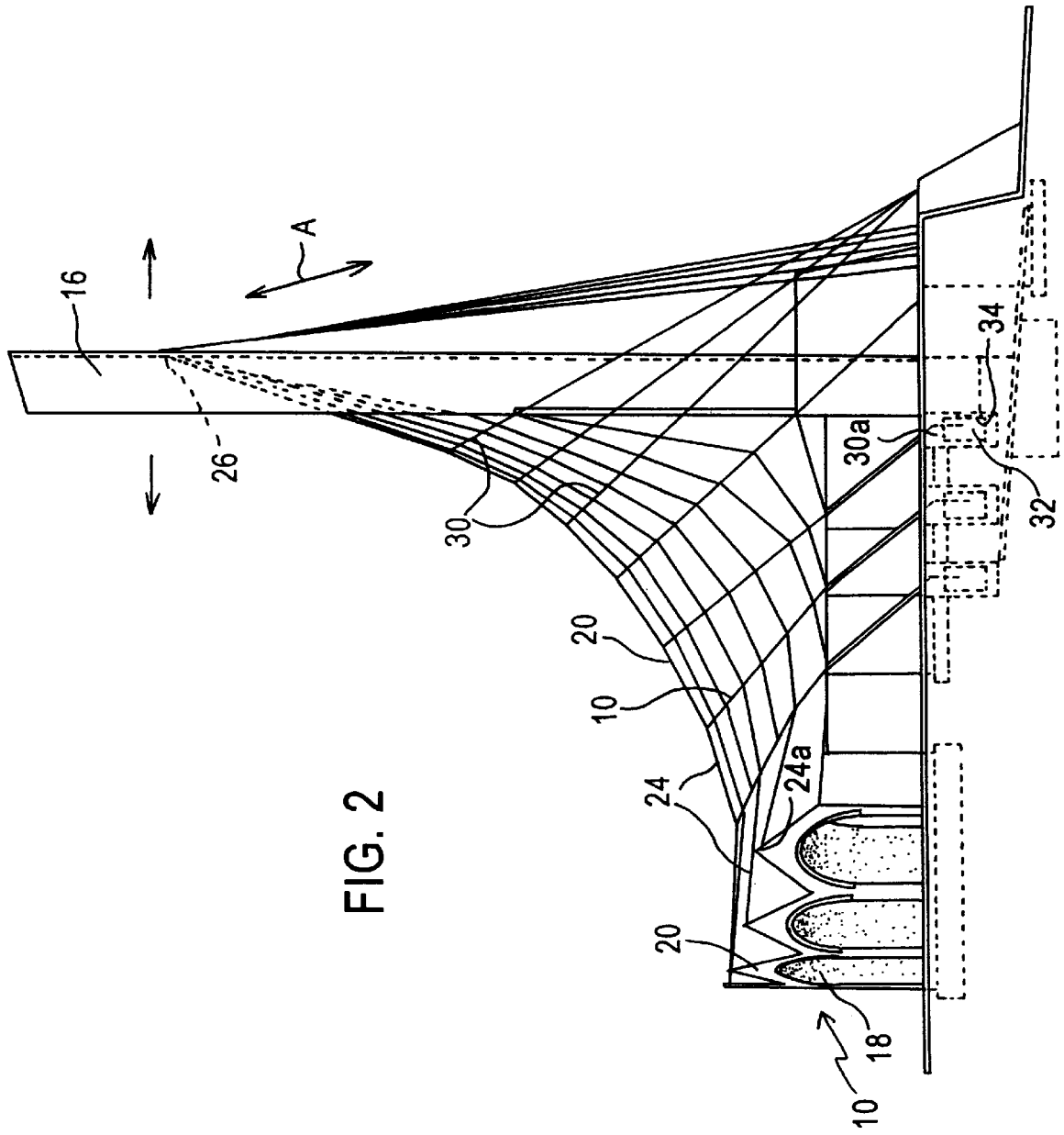
FIG. 2 is a right side or east elevation of the chapel of FIG. 1.
Figure 3:
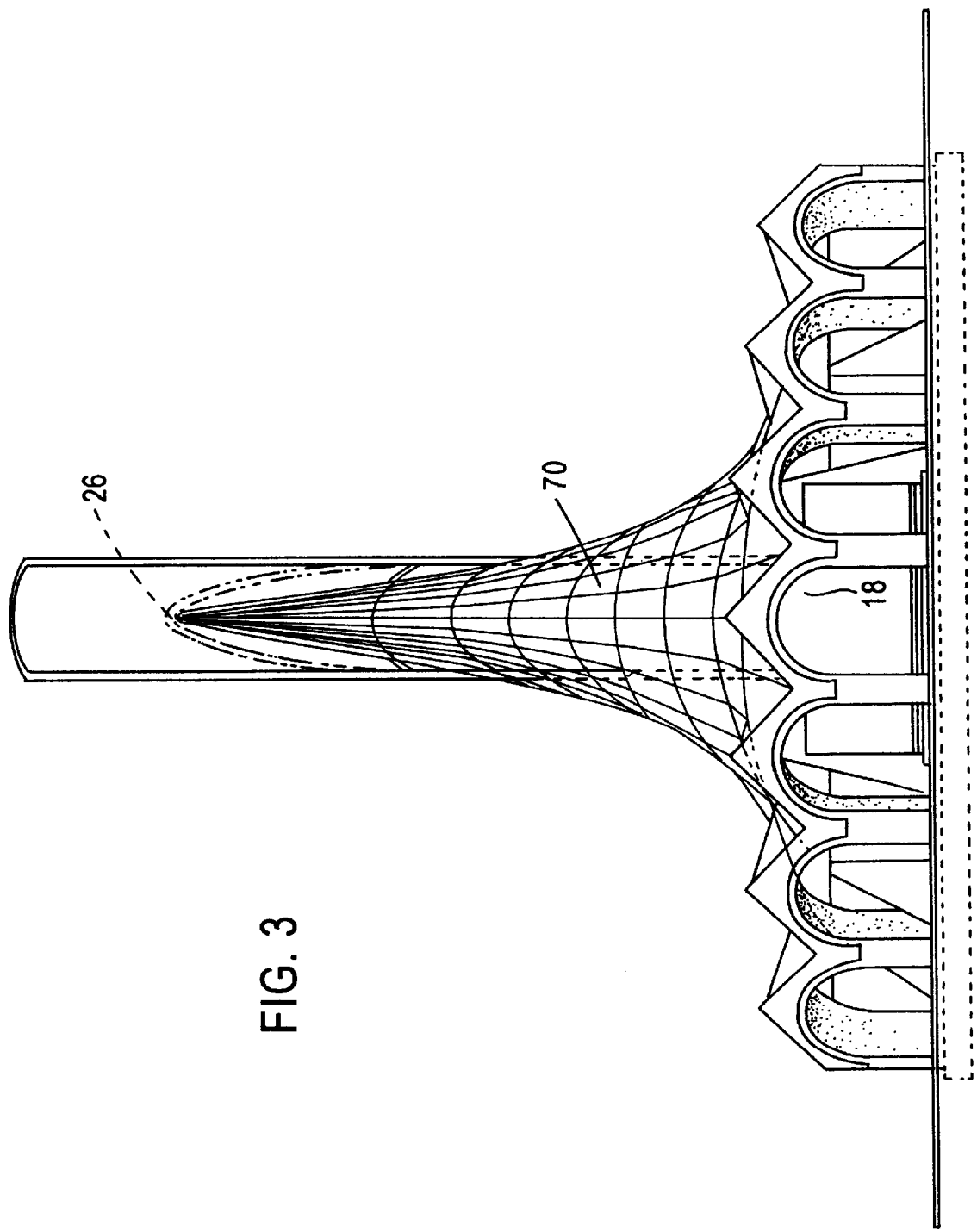
FIG. 3 is a front or south elevation of the chapel of FIG. 1.
Figure 5:
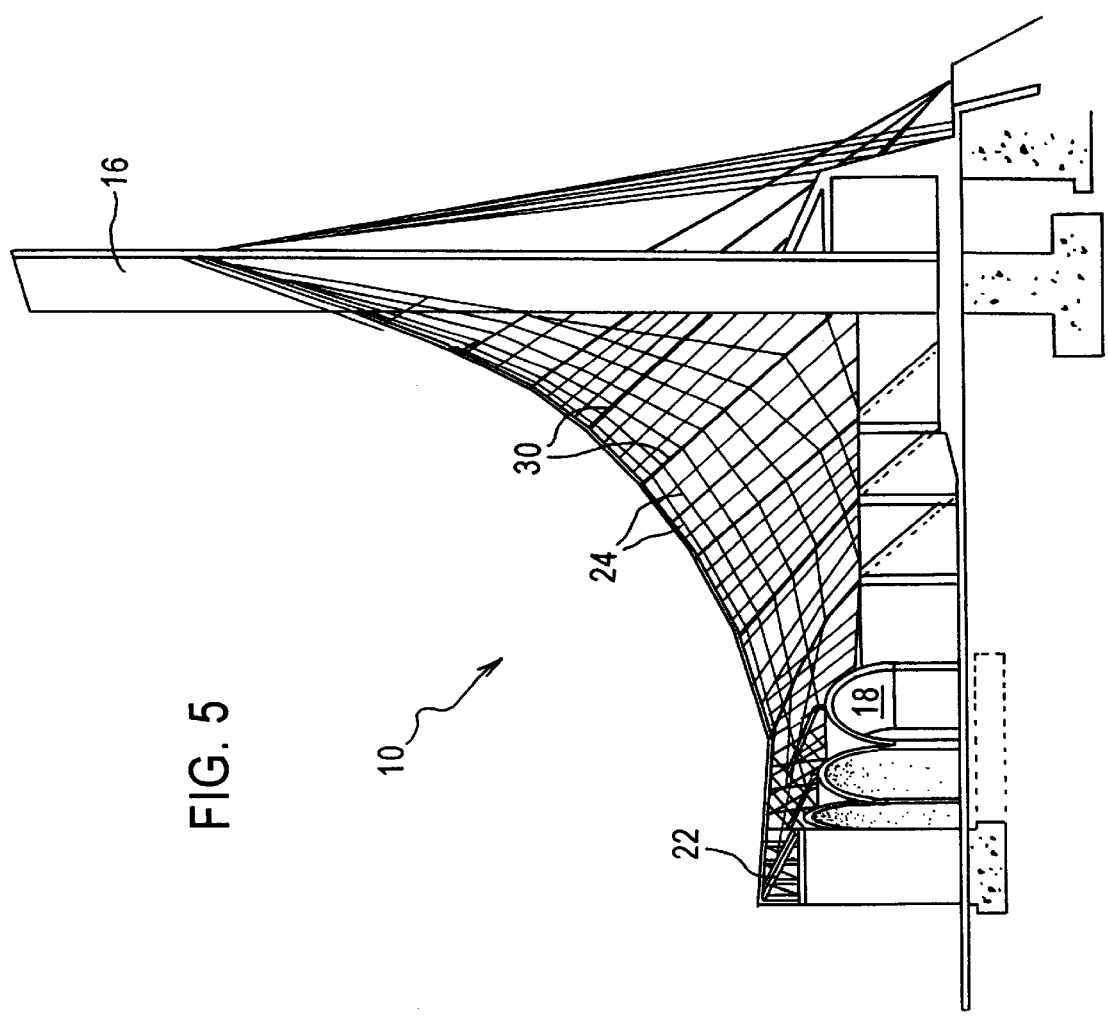
FIG. 5 is a right side sectional view of the chapel of FIG. 1.

FIG. 1 is a perspective view illustration of a preferred embodiment of the present invention in which a cable braced, open air chapel or meeting hall 10 is an uplifting copper and wood structure 12 supported by stainless steel cables 24 suspended from a towering concrete steeple 16. A plurality of precast concrete arches 18 comprise the entrance or narthex. Each arch supports 18 a gabled structure 10 (e.g. which may be a prefabricated steel structure 22 as depicted in FIG. 5) to which the front ends 24 of the set of cables 24 are fixedly attached. These cables 24 extend rearwardly and upwardly in a concave orientation (when viewed from the right or left side elevation as depicted in FIG. 2). The cables 24, at their highest elevation, extend slidably through the tower 16 as a result of a unique cable support structure 26 embedded within the tower that permit the cables 24 to slide back and forth relative to the tower due to expansion and contraction of the cables and/or chapel structure.

A second set of cables 30 extends circumferentially (i.e. in the left-right direction) in radially spaced relationship to each other along the first set of cables 24. One or both opposite ends 30a of each second cable 30 is attached to a free weight 32 disposed within a cavity 34 dug into the ground along the right and left hand sides of the building structure 10. These weights 32 may be substituted with springs (not shown) connecting the cable ends 30a to the ground or other support. In either embodiment, the weights 32 or springs serve to tension the cables 30 in the downward direction. Since these cables 30 are connected to the first cables 24 at spaced intervals with a clamp 40 of the type depicted in FIG. 8, the tension cables 30 transmit countertension to the first set of cables 24 which result in a cabled structure that maintains rigidity as a result of the countertension provided in the unique manner described above.

Figure 8:
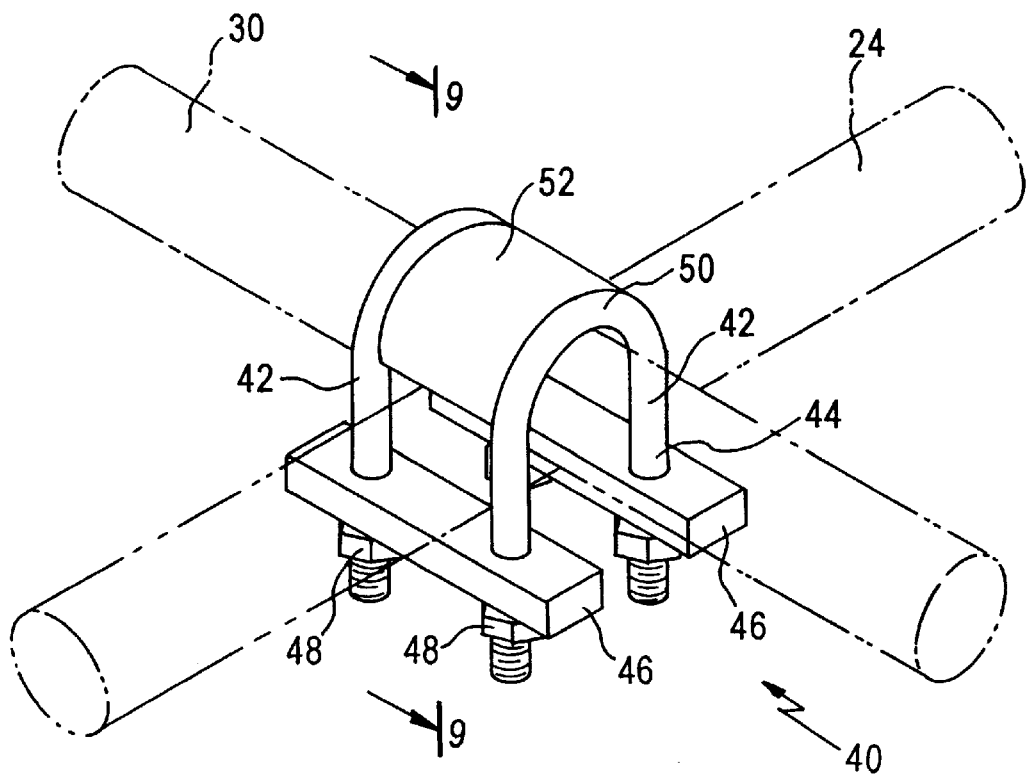
FIG. 8 is a perspective view of a cable clamping arrangement for connection of two sets of cables used in the invention.
Figure 9:
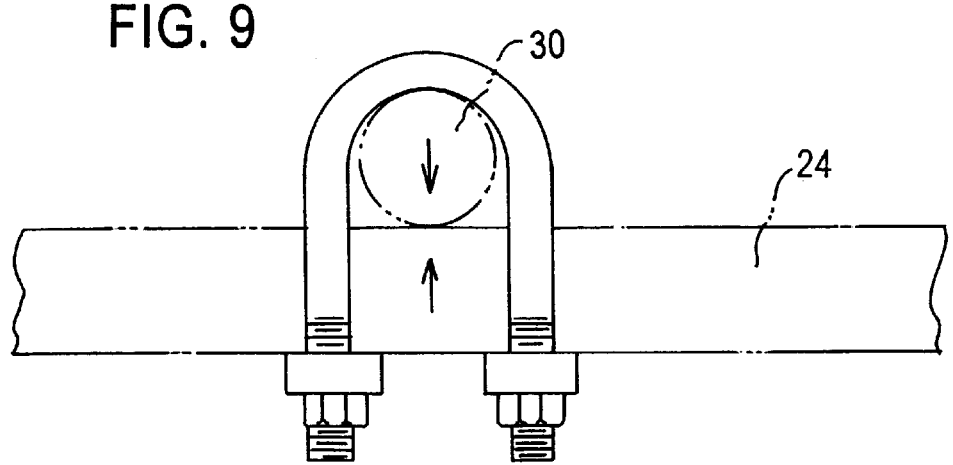
FIG. 9 is a sectional view taken along 9—9 of FIG. 8.

The cable connectors 40 as depicted in FIG. 8 may take the form of a pair of parallel U-shaped members 42 each having arms 44 extending through a pair of parallel spaced bars 46. The free end of each U-shaped member 42 located beneath the respective bar 46 may be threaded to receive a nut 48. The bights 50 of the U-shaped members 42 may be interconnected with a semi-cylindrical reinforcement member 52 (e.g. a piece of pipe). A cable 30 of the second set extends through the openings defined by the U-shaped members 42 while a cable 24 of the first set extends substantially orthogonally to the second cable through a space formed between the U-shaped members 42. After the connector 40 is suitably oriented to establish a spatially desirable node at a point of intersection between two of the cables 24, 30, the cables are then tightened together by tightening the clamping nuts 48. FIG. 9 is a sectional view taken along 9—9 of FIG. 8, wherein opposing forces DT and UT are depicted respectively in counter-acting cables 30 and 24. As depicted in FIG. 9, the downwardly tensioned cables 30 of the second set impart countertension to the first cables 24 to create the rigid cabled structure.

Figure 4:
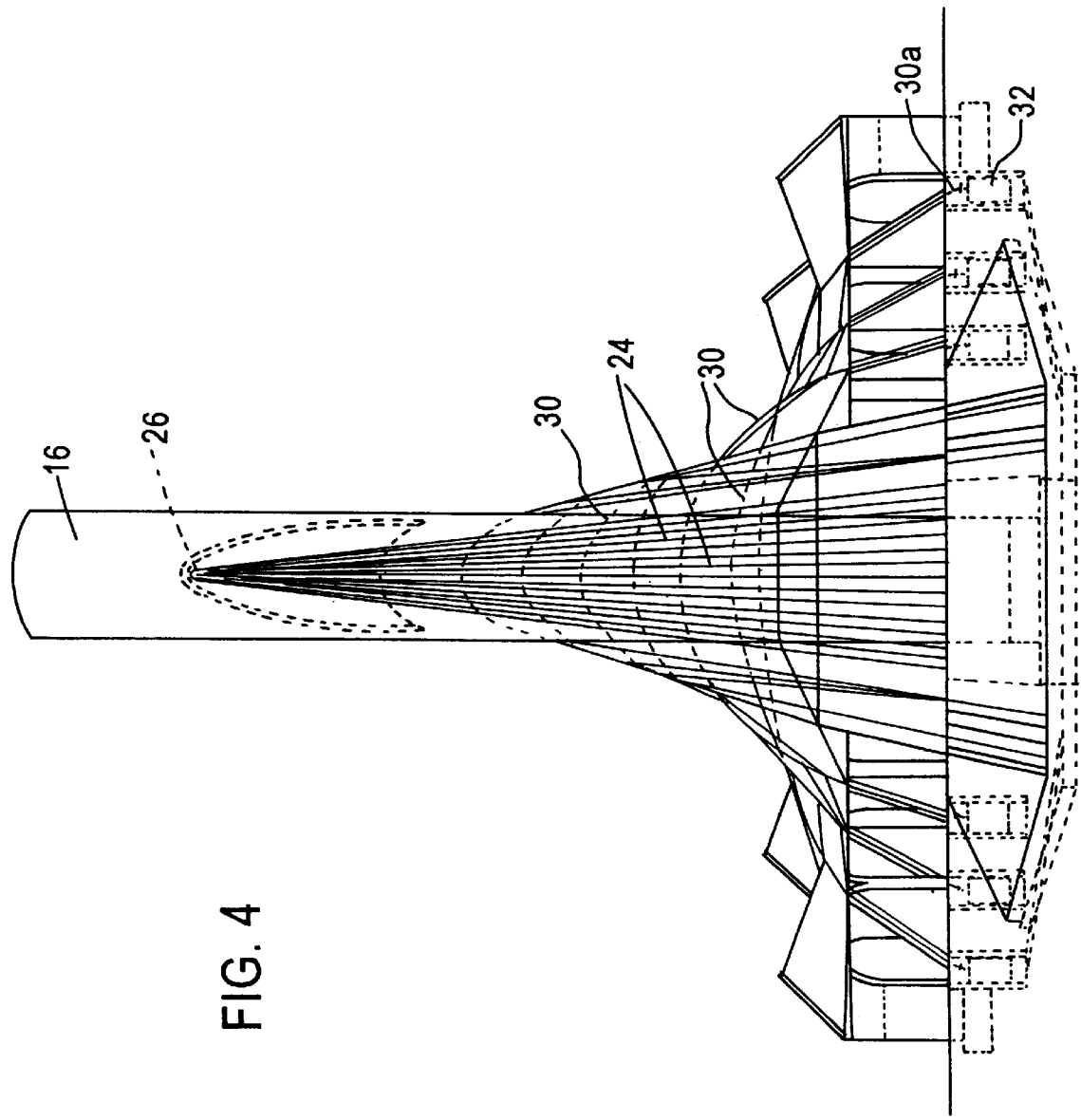
FIG. 4 is a rear or north elevation of the chapel of FIG. 1.

The upward acting tension transmitted to the first cable set 24 from the second cable set 30 is transmitted to the end points of connection of the first cables to their appropriate load bearing supports. In accordance with a preferred feature of the invention, the uppermost extending portions of the first cable set 24 passes through the tower 16 via sliding threaded engagement through a series of hollow pipes 60 (FIG. 7) embedded within the tower structure. The individual pipes 60 have opposite open ends 60a communicating respectively with the front and back of the tower 16. In this manner, the first set cables 24 respectively pass through the individual pipes 60 and then fan outwards and downwards (see FIG. 4) for fixed (or weighted) connection at lower ends thereof to appropriate load bearing connections to the ground.

Figure 7:
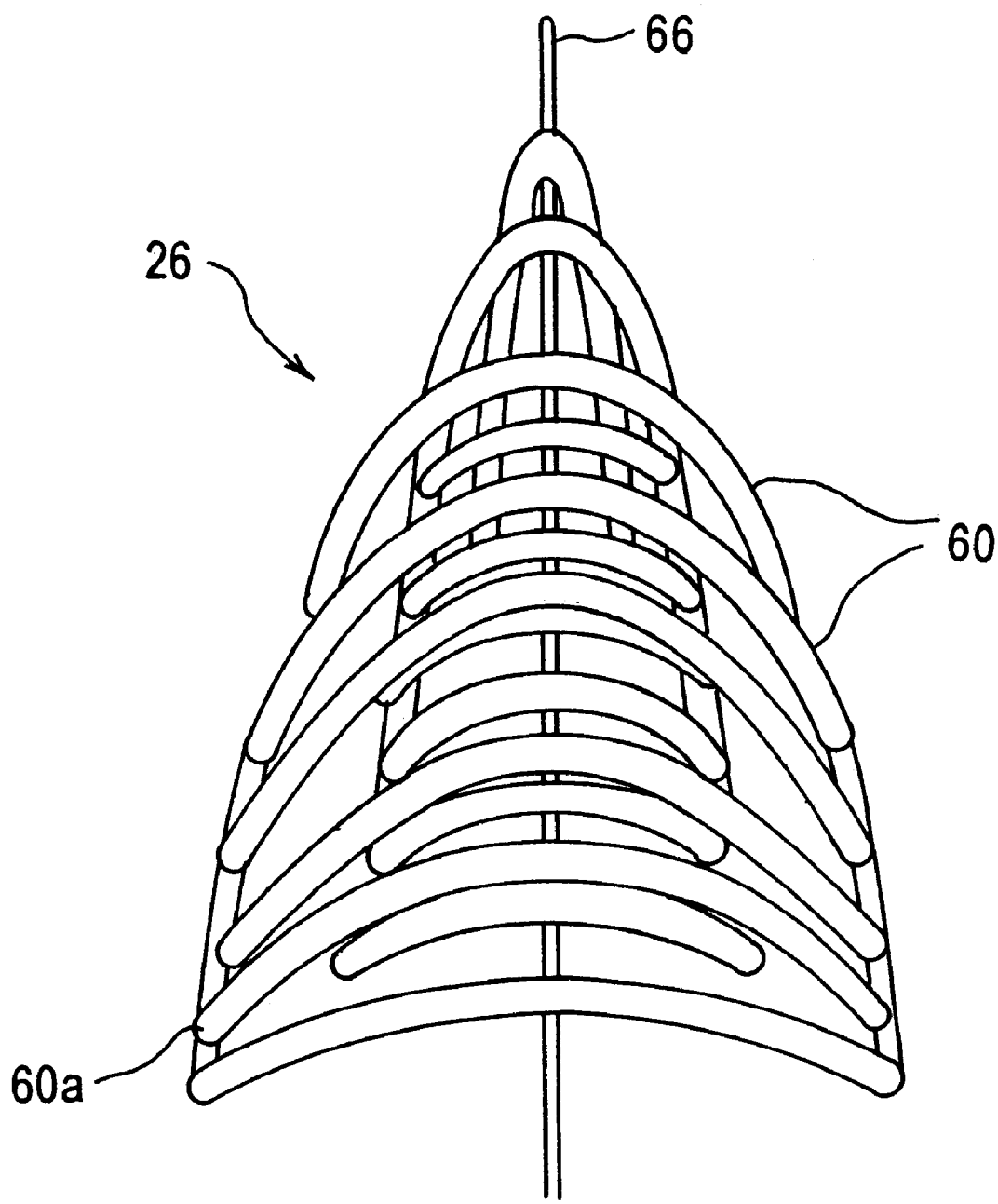
FIG. 7 is a perspective view from the front or south as viewed in FIG. 3 of a casting used for connection of steel cables to an elevated tower or support structure in accordance with another aspect of the invention.

FIG. 7 is a perspective view representation of a plurality of welded hollow pipes forming the cable guiding structure 26 of integral or unitary construction which is adapted to be embedded within the concrete tower 16 depicted in FIG. 1 to receive the respective cables 24 depicted in FIG. 1 through opposite ends 60a thereof. This type of unique guiding structure advantageously provides an effective means for operatively connecting the cables 16 to the tower at a more or less single point of convergence while allowing the cables to slide (see arrows A in FIG. 2) relative to the tower for expansion and contraction as a result of thermal changes in the cables or the building. By connecting the cables 24 to the tower 16 in this unique manner, the construction of the tower does not have to be as robust (and concomitantly expensive) as would occur if the upper ends of the first set cables were fixedly attached only to the upper end of the tower as the sole means of cable support.

As mentioned above, the unique cabled structure may support a variety of different types of roofing materials. For example, rafters may be connected to one or both sets of cables 24, 30 with conventional rafter hangers. Conventional plywood sheeting (4'×8' panels) may be fixed to the rafters and covered with copper sheeting 70 to create an aesthetic yet robust structure resistant to high winds and adverse weather elements.

Figure 6:
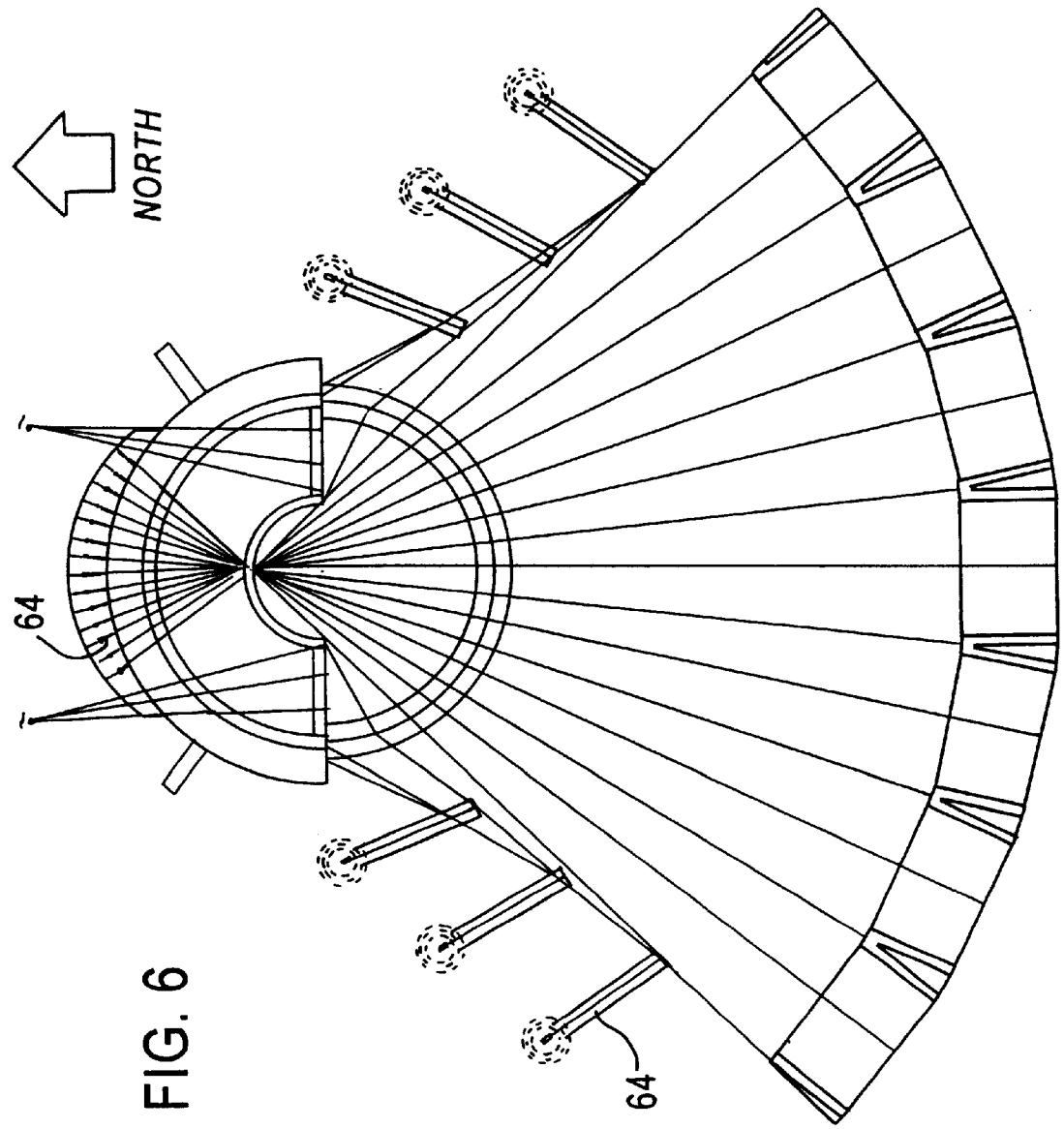
FIG. 6 is a top plan view of the chapel of FIG. 1.

Means for tightening the first and second sets of cables 24, 30 at their opposite ends is preferably provided to ensure a taut and properly tensioned cabled structure. Such means may be turnbuckles 64 such as schematically depicted in FIG. 6. As shown therein, such tightening means may also be provided at only one end of each cable set 24, 30.

The tower 16 may be semi-cylindrical in construction, for example, from stacked semi-cylindrical concrete sections with 2 inch diameter steel rods 66 extending continuously vertically through the entire tower height. The steel rods 66 may also, for example, be fixed to the guiding structure 26 through which the first cables 24 are sideably received. Other tower shapes and methods of reinforcement are also possible.

In one embodiment of the invention, the overall floor plan of the chapel 10 is fan shaped (see FIG. 6) with seven precast concrete arches, each spanning 8 feet, comprising the entrance, or narthex. At its highest point the narthex may be 14½ feet. The perimeter of the arches total 73 feet, including supports.

The 65 foot tower steeple is comprised of 12 concrete components, cast from the same mold as the concrete arches 18, thus reducing cost. The sloping copper and plywood roof 70, weighing approximately 3½ tons, is supported by 15 stainless steel first set cables 24 suspended from the tower 16 rising above the altar. The highest interior point in this chapel design is 53 feet, where a 120 square foot ultra violet resistant fiberglass skylight allows southern sun to bask and illuminate the sanctuary below. The copper roof 70 will eventually turn green and blend into the surrounding countryside.

The sanctuary of the invention in the preferred embodiment, which can serve as an altar or stage, is an elevated semi-circle 18 feet wide. Behind it is a 150 square foot storage area which can also serve as a back stage. The distance out from the back of the altar tower to the outside narthex is 47 feet, providing a seating capacity in the nave of 150. The seats may be removable.

The chapel 10 design of the present invention functions as a modern day cathedral. As is known, great gothic cathedrals built centuries ago from heavy stone materials achieved an exalted feeling that today is not economically feasible. However, with the present invention, it is possible to achieve this uplifting feeling as a result of the unique and robust design provided by the counter tensioned cable structure described hereinabove. With the design of the invention, any one of the 15 cables of the first set 26 is capable of holding three times the weight of the roof.

The unique cable connectors 40 used to clamp the cables together as depicted in FIG. 8 are initially loosely mounted onto the cables 24, 30 at their points of intersection. The cables 24 of the first set can then be movably adjusted relative to the cables 30 of the second set before the clamps 40 are tightened to fix the nodal points of connection between the two sets. In this manner, the entire network of cables 24, 30 can be laid out (e.g. like a spider web) loosely. Once the nodes are all properly laid out, the clamps 40 can then be tightened. In practice, the nodes would be properly aligned and then progressively clamped from the center of the roof and outwards.

Figure 12:
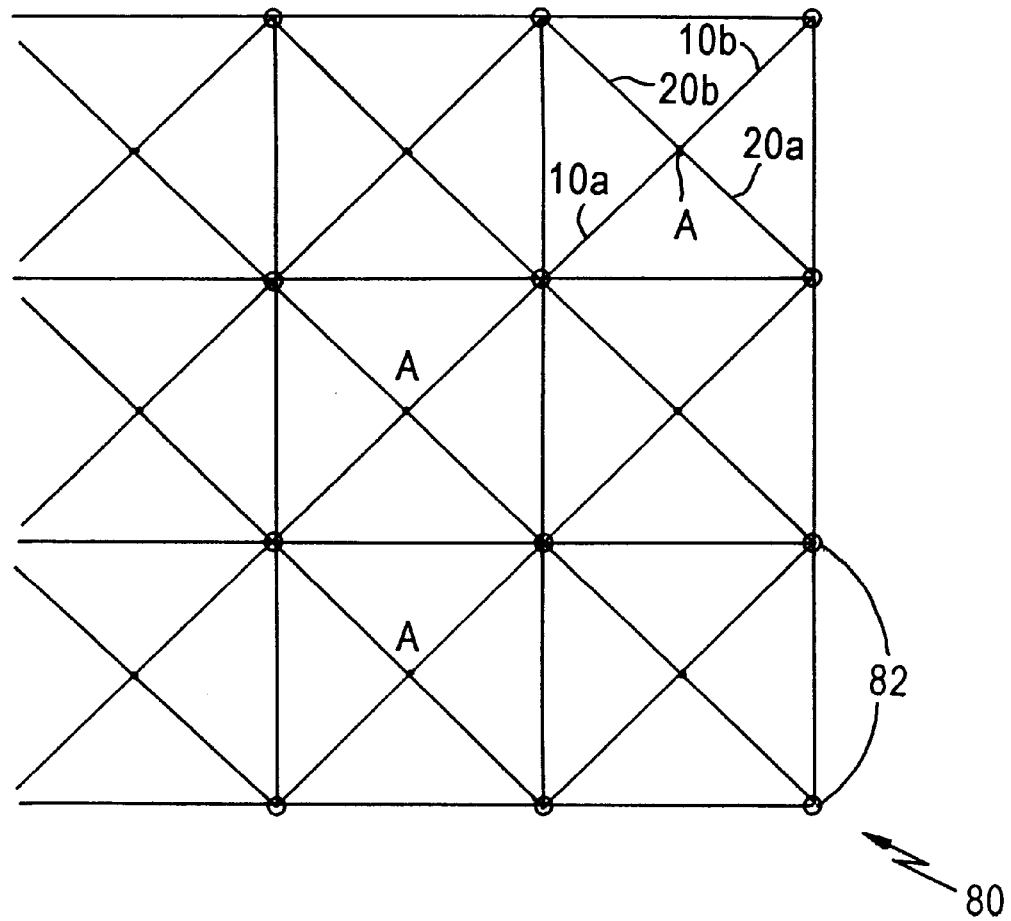
FIG. 12 is a schematic top plan view of yet another embodiment of the invention.
Figure 13:
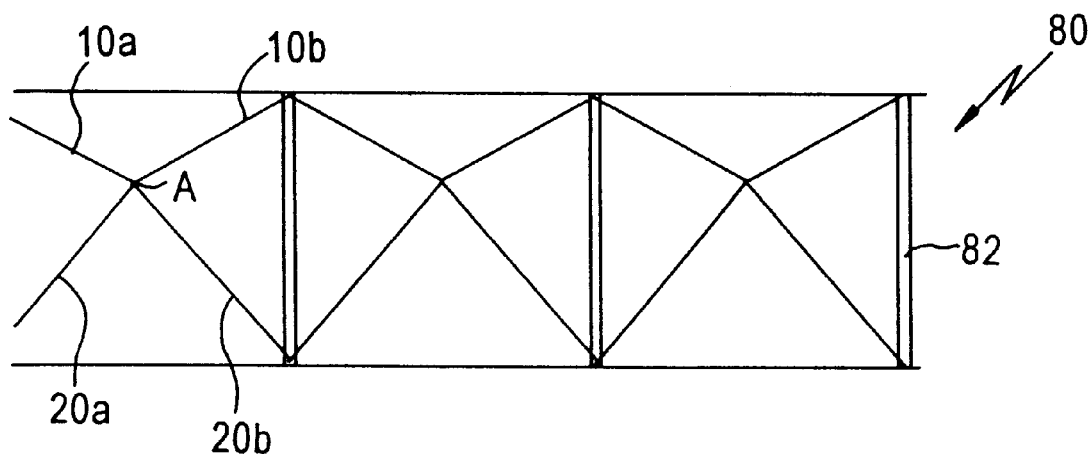
FIG. 13 is a side elevation schematic view of the FIG. 12 embodiment.

FIGS. 12 and 13 are top and side elevation view illustrations of another embodiment of a building structure incorporating the principles of this invention. In this embodiment, a module 80 is formed from a series of vertically extending horizontally spaced poles 82. A first cable having cable elements 10A, 10B are respectively attached to upper ends of the poles 82 and a second cable formed from elements 20A and 20B overlap the first cable 10A, 10B at points A and have lower ends attached to bottom sections of the poles. The lower ends of cable 20A, 20B may be weighted or attached to springs that impart tension to the cables 20A, 20b which is transmitted as countertension to cable elements 10A, 10B. Instead, the poles may also be spring loaded, e.g., of a spring loaded telescopic construction. At the point of connection A, the cables may be connected to one another with the cable connector 40 of FIG. 8. In another variation of this embodiment, two sets each of cables 10A, 10B and 20A, 20B may be respectively connected to each of the four upper and lower ends four poles 82 defining one of the square grids. In this type of configuration, the FIG. 8 clamp would be modified to accept four cables (i.e. two top cables and two bottom cables) instead of two. Other configurations are also possible such as depicted in FIGS. 10 and 11.

A configuration 100 depicted in FIG. 10 (elevational view) includes outwardly tilted towers 105 and 110 spaced apart on a support surface 115. A cable 120 is suspended between upper portions of towers 105, 110 above surface 115. A series of spaced apart tension cables 125 extend between surface 115 and cable 120, and are coupled to cable 120 with an appropriately modified FIG. 8 clamp.

A configuration 200 depicted in FIG. 11 (top plan view) includes a first series of poles 205 having poles spaced apart in the X-direction and an opposing second series of poles 210 having poles spaced apart in the X-direction. The series of poles 205 are spaced from the series of poles 210 in the Y-direction. A series of cables 215 are respectively suspended in the Y-direction between opposing pairs of poles selected from the first and second series of poles 205, 210. Opposing downward pulling segments of the series of cables 215, e.g. cable segments 220, 225, are supported respectively by the poles in the series of poles 210, 205 to tension the series of cables 215.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein.

What is claimed is:

1. A building structure, comprising:
   a. a first set of cables extending in spaced relation to each other;
   b. a second set of cables extending in a direction transverse to said first set of cables and being operatively connected with said first set of cables to apply counter tension to said first set of cables to enable said first and second sets of cables to thereby define a rigid counter tensioned structure;
   c. anchors connected to said first and second sets of cables for anchoring said first and second sets of cables to a support structure; and
   d. a load bearing member including a series of elongate passageways fixedly mounted to said load bearing member, said second set of cables respectively extending through and being slidably supported by said elongate passageways to enable movement of said cables through said elongate passageways as a result of thermal expansion and contraction, said load bearing members being an elongated tower and including a series of elongate passageways fixedly mounted to the tower, said first set of cables respectively extending through and being slidably supported by said elongate passageways to enable movement of said cables through said elongate passageways as a result of thermal expansion and contraction.

2. The building structure of claim 1, wherein said anchoring means includes a plurality of load bearing members to which the first and second sets of cables are operatively connected, said first and second sets thereby defining at least a roof region of said building structure.

3. The building structure of claim 2, further comprising a series of panel members operatively attached to and supported by at least ones of said first and second sets of cables.

4. The building structure of claim 3, wherein at least a selected one of said panels is transparent to create a skylight.

5. The building structure of claim 2, wherein one of the load bearing members is at least one elongated tower or one or more poles and said second set of cables are operatively connected and partially supported by the tower.

6. The building structure of claim 5, wherein said series of elongate passageways includes a series of hollow tubular members fixedly mounted to the tower or a series of towers.

7. The building structure of claim 6, wherein ends of said second set of cables located on one side of the tower are secured to ones of said load bearing members, and opposite ends of said second set located on another side of said tower are connected to others of said load bearing members.

8. The building structure of claim 7, wherein said ends of said second set are fixed to said load bearing members.

9. The building structure of claim 7, wherein said ends of said second set are connected to weights or springs that apply tension to said second set.

10. The building structure of claim 6, wherein said second set of cables extend in radial directions relative to the tower as a center point, and said first set extends generally perpendicular to the second set in a circumferential direction or as chords relative to the tower and said second set.

11. The building structure of claim 10, wherein said first set has ends which are weighted or connected to springs that apply tension to the first set.

12. The building structure of claim 6, wherein said hollow tubular members are fixedly connected to each other to form a rigid structure of integral or unitary construction at the tower or pole junctions or are on supports between the pole junctions.

13. The building structure of claim 6, wherein said hollow tubular members are a casted structure to form a rigid structure of integral or unitary construction.

14. The building structure of claim 5, further comprising a mounting structure fixedly mounted to the tower, poles or intermittent structure and having a series of passageways through which the second set of cables respectively extend.

15. The building structure of claim 14, wherein said second set is slidably supported by said mounting structure.

16. The building structure of claim 14, wherein said mounting structure is of a honeycomb construction.

17. The building structure of claim 1, further comprising means for tightening selected ones of said first and second cables.

18. The building structure of claim 17, wherein said tightening means include turnbuckles.

19. The building structure of claim 1, further comprising means for clamping the first and second cables together to transmit tensile force from one set of cables to the other set.

20. A building structure, comprising:

a. a first set of cables extending in spaced relation to each other;

b. a tensioning assembly connected to said first set of cables, c. load bearing members to which the first set of cables are operatively connected and anchored to a support surface, one of the load bearing members being an elongated tower and including a series of elongate passageways fixedly mounted to the tower, said first set of cables respectively extending through and being slidably supported by said elongate passageways to enable movement of said cables through said elongate passageways as a result of thermal expansion and contraction.

21. The building structure of claim 20, wherein said elongate passageways are hollow tubular members fixedly mounted to the tower, wherein said one of the load bearing members is a pole and/or an intermittent structure.

* * * * *